US010005487B2

(12) United States Patent
Stebbins et al.

(10) Patent No.: US 10,005,487 B2
(45) Date of Patent: Jun. 26, 2018

(54) VISCOUS DAMPERS FOR STEERING COLUMNS OF MOTOR VEHICLES

(71) Applicant: GM GLOBAL TECHNOLOGY OPERATIONS LLC, Detroit, MI (US)

(72) Inventors: Mark A. Stebbins, Bloomfield Hills, MI (US); Oliver Eichelhard, Reinheim (DE); Sharath Varadappa, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 15/220,675

(22) Filed: Jul. 27, 2016

(65) Prior Publication Data
US 2018/0029629 A1    Feb. 1, 2018

(51) Int. Cl.
| | | |
|---|---|---|
| *B62D 1/19* | (2006.01) | |
| *B62D 1/185* | (2006.01) | |
| *F16F 15/16* | (2006.01) | |
| *B62D 7/22* | (2006.01) | |

(52) U.S. Cl.
CPC .............. *B62D 1/19* (2013.01); *B62D 1/185* (2013.01); *B62D 7/224* (2013.01); *F16F 15/161* (2013.01)

(58) Field of Classification Search
CPC .......... B62K 21/08; B62D 7/224; B62D 1/19; B62D 1/185; F16F 15/161; F16F 9/53; F16F 9/103; F16F 9/10
See application file for complete search history.

(56) References Cited

U.S. PATENT DOCUMENTS

| | | | | |
|---|---|---|---|---|
| 927,735 A | * | 7/1909 | Lemp ...................... | B62D 7/22 188/292 |
| 2,838,125 A | * | 6/1958 | Staude ..................... | B62D 6/02 180/400 |
| 3,084,566 A | * | 4/1963 | Pistillo ..................... | B62D 7/22 114/144 R |
| 3,435,700 A | * | 4/1969 | Calhoun ................. | B62D 1/192 180/78 |
| 4,170,380 A | * | 10/1979 | Raitport ............... | B60N 2/4221 267/153 |

(Continued)

*Primary Examiner* — Paul N Dickson
*Assistant Examiner* — Timothy Wilhelm
(74) *Attorney, Agent, or Firm* — Quinn IP Law

(57) ABSTRACT

Disclosed are vehicle steering column assemblies with viscous dampers, methods for making and for using such assemblies, and motor vehicles with steering column assemblies having viscous dampers. A steering column assembly is disclosed that includes a first shaft member that connects to a steering wheel/handle, and a second shaft member that connects to a vehicle body. These shaft members are telescopingly connected such that one shaft member selectively translates longitudinally with respect to the other shaft member. A viscous damper assembly is interposed between the two shaft members. The viscous damper assembly includes a damper housing with first and second reservoir volumes disposed inside the housing. Multiple constricted flow channels fluidly connect the reservoir volumes. Viscous fluid flows from the first reservoir volume, through the constricted flow channels, to the second reservoir volume in response to relative vibrational displacement between the shaft members to thereby viscously attenuate vibrational energy.

20 Claims, 2 Drawing Sheets

(56) References Cited

U.S. PATENT DOCUMENTS

| | | | | |
|---|---|---|---|---|
| 4,255,986 A * | 3/1981 | Mukoyama | F16F 7/127 | 188/377 |
| 4,352,304 A * | 10/1982 | Warner | F16F 9/12 | 188/290 |
| 4,643,448 A * | 2/1987 | Loren | B62D 1/192 | 280/752 |
| 4,886,295 A * | 12/1989 | Browne | B62D 1/197 | 180/78 |
| 5,332,260 A * | 7/1994 | Heinrichs | B62D 1/184 | 188/300 |
| 6,120,046 A * | 9/2000 | Daly | B62D 7/224 | 267/273 |
| 6,148,970 A * | 11/2000 | Akad | B60R 19/36 | 188/266 |
| 6,279,952 B1 * | 8/2001 | Van Wynsberghe | B62D 1/192 | 280/777 |
| 6,296,280 B1 * | 10/2001 | Struble | B62D 1/195 | 280/777 |
| 6,467,836 B1 * | 10/2002 | Miller | B60R 19/00 | 188/374 |
| 6,547,043 B2 * | 4/2003 | Card | B62D 7/224 | 188/267.2 |
| 6,634,250 B2 * | 10/2003 | Schroter | B62D 1/192 | 188/268 |
| 6,681,883 B2 * | 1/2004 | Loh | B62D 5/22 | 180/417 |
| 6,752,425 B2 * | 6/2004 | Loh | B62D 7/224 | 180/417 |
| 6,846,015 B2 * | 1/2005 | Meduvsky | B60R 21/02 | 188/188 |
| 7,165,786 B1 * | 1/2007 | Sha | B62D 1/184 | 280/775 |
| 7,316,419 B2 * | 1/2008 | Fischer | B62D 7/224 | 280/771 |
| 7,380,804 B2 * | 6/2008 | Lee | B62D 7/224 | 280/777 |
| 7,722,061 B2 * | 5/2010 | Kohls | B62D 7/224 | 280/89.11 |
| 7,823,708 B2 * | 11/2010 | Maranville | F16F 9/535 | 188/267 |
| 8,121,757 B2 * | 2/2012 | Song | B62K 21/08 | 280/283 |
| 8,632,096 B1 | 1/2014 | Quinn et al. | | |
| 8,632,097 B1 | 1/2014 | Quinn et al. | | |
| 8,696,003 B2 | 4/2014 | Eichelhard et al. | | |
| 2003/0089166 A1 * | 5/2003 | Mizuno | G01L 5/221 | 73/117.02 |
| 2005/0167966 A1 | 8/2005 | Fischer | | |
| 2006/0119063 A1 * | 6/2006 | Bodin | B62D 7/224 | 280/89 |
| 2009/0183959 A1 | 7/2009 | Klit et al. | | |
| 2011/0017556 A1 * | 1/2011 | Maranville | B62D 7/224 | 188/267.2 |
| 2015/0082936 A1 | 3/2015 | Hebenstreit et al. | | |
| 2017/0158222 A1 * | 6/2017 | Schulz | B62D 5/006 | |

* cited by examiner

VISCOUS DAMPERS FOR STEERING COLUMNS OF MOTOR VEHICLES

TECHNICAL FIELD

The present disclosure relates generally to steering systems for motor vehicles. More specifically, aspects of this disclosure relate to vibration damping devices for attenuating vibrational energy transmitted through the steering column and steering wheel of a motor vehicle's steering system.

BACKGROUND

Current production motor vehicles, such as the modern-day automobile, are originally equipped with a steering system that allows the driver to maintain a desired course for the vehicle and to control directional changes of the vehicle. A conventional steering system is provided with a hand-operated steering wheel that is manipulated by the driver to input a desired direction of travel for the vehicle. The steering wheel is mounted via a central hub to a collapsible or non-collapsible steering column assembly. Telescoped shafts of the collapsible steering column interconnect the steering wheel with the vehicle's steering mechanism, the most common of which is the rack-and-pinion steering architecture. In this architecture, a pinion gear at the distal end of a steering shaft is intermeshed with a linear gear bar, known as a "rack." When the steering wheel is rotated, the pinion gear spins, causing the rack to move rectilinearly. A tie rod at each end of the rack is connected to the steering arm of a wheel's spindle; the moving rack and tie rod pivot the spindle to thereby turn the wheel. Driver input can be augmented with hydraulic or electric Power Assisted Steering and, in some modern production vehicles, assisted with computer controlled motors known as Electric Power Steering.

Generally, the internal combustion engine (ICE) of a motor vehicle can be operated over various speeds. An engine can operate, for example, at a low (idle) speed with the powertrain in an idling state of operation, and can also operate at a lower (park) speed with the powertrain in a parked state of operation. Each speed of the engine can correlate with a distinct vibrational frequency that may be transmitted to the operator through the steering wheel and steering column assembly of the steering system. Vibrations induced by the vehicle's powertrain (including the engine and transmission) are typically classified as "resonant excitation" or as "deterministic vibration." Road-induced vibrations can also be experienced by the operator through the steering wheel and column during operation of the vehicle, e.g., if driving over irregularly spaced road displacements, such as potholes and speed bumps. These road induced vibrations are typically classified as "forced excitation" or as "random vibration." It is oftentimes desirable to attenuate powertrain and road induced vibrations to improve the driver's experience during operation of the vehicle.

SUMMARY

Disclosed herein are steering column assemblies with viscous dampers, methods for making and methods for using steering column assemblies with viscous dampers, and motor vehicles with an adjustable steering column assembly employing a viscous damper for attenuating wheel vibration levels. By way of example, and not limitation, a novel viscous damper device for the telescoped inner and outer jackets of a collapsible steering column is disclosed. In this example, the viscous damper device includes an annular radial damper housing that is mounted around an outer dimeter (OD) surface of the steering column's inner jacket, e.g., seated within a complementary toroidal slot. Alternatively, the damper housing can be seated on the non-telescoping inner steering shaft ("I-shaft") that is coupled, e.g., via an intermediate coupler shaft to the pinon of a rack-and-pinion steering mechanism. The damper housing contacts an inner diameter (ID) surface of the steering column's outer jacket, which is designed to permit free rotation about the I-shaft. Within the damper housing are fluid-filled reservoir volumes that are fluidly coupled via a series of intermediate flow channels.

Constricted inner flow channels allow viscous fluid flow out of a decreasing reservoir volume into an increasing reservoir volume, e.g., during bending deflection of the inner/outer jacket. These reservoir volumes can be column vertical, column lateral, or a complex combination of the two degrees of freedom. The viscous fluid flow provides viscous damping into localized motions resulting in the column response reductions. The viscous damper can be tuned to attenuate the steering column's vertical and/or lateral bending frequencies, and can be placed longitudinally at or nearest the amplitude of maximum relative displacement. Positioning can be determined, for example, by plotting the relative displacements along the length of the steering column or through FEA simulation that identifies points of maximum and minimum relative displacement. The relative displacement across the viscous damper results in energy dissipation that reduces the steering column and wheel customer interface vibration levels.

Attendant benefits for at least some of the disclosed concepts include attenuating resonant powertrain and road-induced vibrations in the steering wheel and steering column assembly utilizing the relative vibrational displacement of existing internal structural members of the steering column. Rough road-shake and powertrain resonance performance is improved, resulting in a commensurate improvement in end-user experience and reduction in idle vibration warranty costs. Other consequent benefits include the elimination of prior art spring-mass dampers devices and torsional damper devices, which are larger, heavier and more expensive than a disclosed viscous damper device. In contrast to convention damper counterparts, a disclosed viscous damper device is inexpensive, lightweight, and can be packaged in existing space within the steering column assembly.

Aspects of the present disclosure are directed to adjustable steering column assemblies with vibration attenuating capabilities for motor vehicles. Disclosed, for example, is a steering column assembly for connecting a steering wheel or handle to a vehicle body of a motor vehicle. The steering column assembly includes a first shaft member that is configured to attach to the steering wheel/handle, and a second shaft member that is configured to attach to the vehicle body. The second shaft member is telescopingly connected to the first shaft member such that the second shaft member can selectively translate longitudinally with respect to the first shaft member. A viscous damper assembly is interposed between the first and second shaft members. This viscous damper assembly includes a damper housing with first and second reservoir volumes disposed inside the damper housing. A plurality of constricted flow channels fluidly connect the first and second reservoir volumes. Viscous fluid flows from the first reservoir volume, through the constricted flow channels, to the second reservoir volume in response to relative vibrational displacement between the first and second shaft members to thereby viscously attenuate vibrational energy. The first reservoir volume can dynamically decrease in size while the second reservoir volume can dynamically increase in size responsive to the displacement between the first and second shaft members.

Other aspects of the present disclosure are directed to motor vehicles employing adjustable or collapsible steering column assemblies with radial viscous dampers. A "motor vehicle," as used herein, may include any relevant vehicle platform, such as passenger vehicles (internal combustion engine (ICE), hybrid, electric, fuel cell, etc.), commercial vehicles, industrial vehicles, all-terrain vehicles (ATV), farm equipment, motorcycles, boats, airplanes, etc. In an example, a motor vehicle is disclosed that includes a vehicle body with a passenger compartment. Multiple driving wheels are rotatably attached to the vehicle body and repositionable to steer the vehicle. A steering mechanism, which may be in the nature of a rack-and-pinion, a recirculating ball, or a worm-and-sector steering architecture, is attached to the vehicle body and operable to reposition one or more of the wheels to steer the vehicle. A manually-operated steering wheel, which is disposed within the passenger compartment, receives driver inputs to control directional changes of the motor vehicle.

The motor vehicle of the above example also includes an adjustable steering column assembly. The steering column assembly includes an inner jacket shaft that is connected to the steering wheel, and has an outer surface with a toroidal pocket. A steering shaft connects the inner jacket shaft to the steering mechanism. The steering column assembly also includes an outer jacket shaft that is connected to the vehicle body. The outer jacket shaft circumscribes the inner jacket shaft and is connected thereto to translate longitudinally in a telescoping manner with respect to the inner jacket shaft. A viscous damper assembly is interposed between the inner and outer jacket shafts. The viscous damper assembly includes an annular damper housing that is nested within the toroidal pocket of the inner jacket shaft and abuts the outer jacket shaft. First and second annular reservoir volumes are disposed inside the damper housing. Circumferentially spaced constricted flow channels extend longitudinally within the damper housing to fluidly connect the first and second reservoir volumes. Viscous fluid stowed within the damper housing flows from the first reservoir volume, through the constricted flow channels, to the second reservoir volume in response to vibrational displacement between the inner and outer jacket shafts to thereby viscously attenuate vibrational energy.

According to other aspects of the present disclosure, methods of making and methods of using adjustable vehicle steering column assemblies with vibration attenuating capabilities are presented. For instance, a method is disclosed for assembling a vehicle steering column assembly. The method includes: providing a first shaft member that is configured to attach to a vehicle steering wheel/handle, e.g., via splined engagement with the wheel hub; providing a second shaft member that is configured to attach to a body vehicle; slidably connecting the first shaft member to the second shaft member such that the second shaft member can translate longitudinally in a telescoping manner with respect to the first shaft member; and mounting a viscous damper assembly between the first and second shaft members. The viscous damper assembly includes a damper housing, first and second reservoir volumes disposed inside the damper housing, and a plurality of constricted flow channels fluidly connecting the first and second reservoir volumes. Viscous fluid flows from the first reservoir volume, through the constricted flow channels, to the second reservoir volume in response to relative vibrational displacement between the shaft members to thereby viscously attenuate vibrational energy. The damper housing, including the reservoir volumes, can be fabricated from a flexible polymer to allow for dynamic flexure of the viscous damper assembly during vibrational displacement of the shaft members. In the same vein, the damper housing, including the reservoir volumes, can take on an annular geometry such that the damper assembly seats on and extends continuously around one of the shaft members. Alternatively, the damper housing may be fabricated with an annular geometry while the reservoir volumes extend lengthwise along a common central longitudinal axis of the shaft members.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
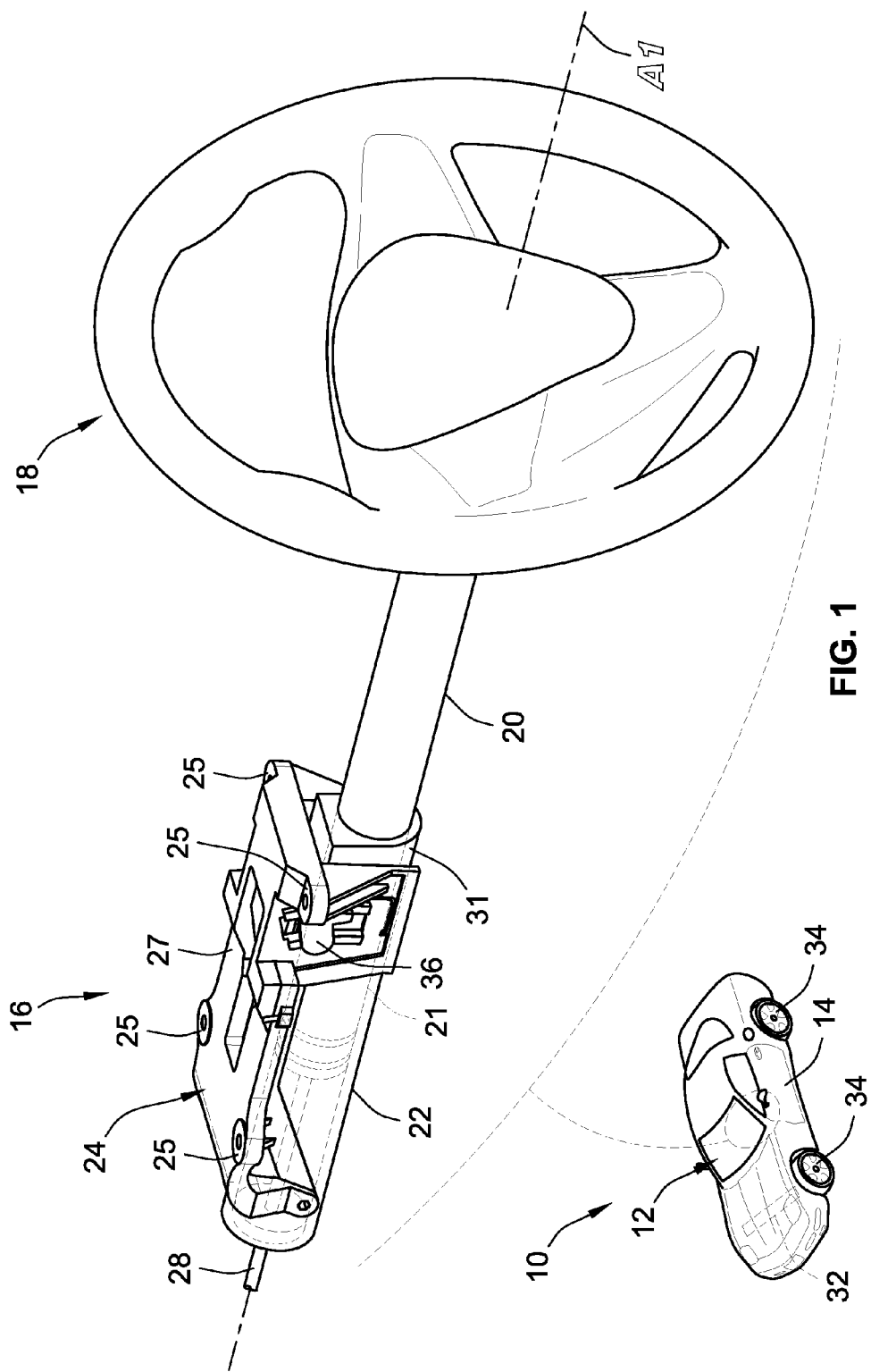
FIG. 1 is an elevated perspective-view illustration of a representative motor vehicle with an inset perspective-view of a steering wheel and adjustable steering column assembly in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 an illustration of a representative automobile, portrayed as a two-door sport coupe and generally designated at 10, in accordance with aspects of the present disclosure. Mounted at a medial portion of the automobile 10, inside the passenger compartment 12 between opposing door assemblies 14, is a vehicle steering column assembly 16. The illustrated automobile 10—also referred to herein as "motor vehicle" or "vehicle" for short—is merely an exemplary application with which the novel aspects of this disclosure can be practiced. In the same vein, the implementation of the present concepts into a power steering assisted rack-and-pinion system should also be appreciated as an exemplary application of the novel concepts disclosed herein. As such, it should be understood that the aspects and features of the present disclosure can be incorporated into other steering system architectures and utilized for any logically relevant type of motor vehicle. Lastly, the drawings presented herein are not necessarily to scale and are provided purely for instructional purposes. Thus, the specific and relative dimensions shown in the drawings are not to be construed as limiting.

Referencing the inset view of FIG. 1, within the passenger compartment 12 of the motor vehicle 10 there is mounted an adjustable or collapsible "telescoping" steering column assembly 16 with a manually-operated steering wheel 18 for setting a desired course of travel—controlling directional changes—of the automobile 10. The steering column assembly 10 includes a first "inner jacket" shaft member 20 and a second "outer jacket" shaft member 22. Typically, the outer jacket shaft 22 is used to mount the telescoping shaft members 20, 22 and steering wheel 18 to the vehicle 10. By way of non-limiting example, a jacket mounting support 24 includes assorted mounting flanges 25 that project transversely from a top surface of a bracket body 27. Each mounting flange 25 includes a fastener hole through which is received a respective mechanical fastener, such as a screw, bolt, stud, snap-fastener, etc., for rigidly securing the jacket mounting support 24, e.g., to a front deck panel of the vehicle frame underneath the forward instrument panel (neither of which is visible in the views provided). Bracket body 27 defines a shaft slot 29 (FIG. 2) through which is received the outer jacket shaft 22. A pair of hex-head bolts, only one of which is visible and labeled 26 in FIG. 2, rigidly couples the bracket body 27 to the outer jacket shaft 22. It should be recognized that the jacket mounting support 24 is merely representative in nature; as such, any now known or hereinafter developed means for mounting the telescoping shaft members 20, 22 to the vehicle body are considered to be within the scope of this disclosure.

According to the illustrated example, a distal end 21 of inner jacket shaft 20 is slidably disposed in the outer jacket shaft 22, as will be described in further detail below, while a proximal end (not visible) is provided with friction fit slots or another mechanical interface for mating with and supporting thereon the steering wheel 18. In effect, the inner jacket shaft 20 functions to slidably and rotatably couple the steering wheel 18 to the outer jacket shaft 22. The above-disclosed functionalities of the inner and outer jacket shafts 20, 22, however, can be considered interchangeable in that the steering wheel 18 can be mounted on the outer jacket shaft 22 while the inner jacket 20 can be mounted to the frame of vehicle 10 for at least some alternative configurations. Recognizably, the steering wheel construction shown in the drawings is provided purely for descriptive purposes and, thus, can be substituted or modified in accordance with any logically relevant driver operated steering mechanism without departing from the intended scope of this disclosure.

Figure 2:
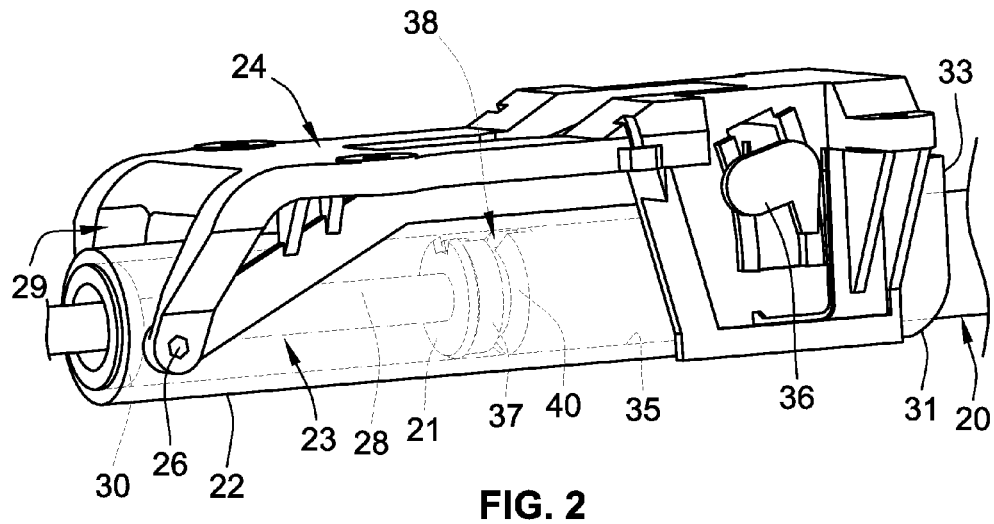
FIG. 2 is an enlarged perspective-view illustration of a portion of the representative steering column assembly of FIG. 1 showing a viscous damper assembly mounted between the steering column's inner and outer jacket shafts.

An inner steering shaft ("I-shaft") 28 extends through the outer jacket shaft 22 and into a central cavity of the inner jacket shaft 20. Provided on a proximal end of the steering shaft 28 is a toothed spindle (not visible) with radially-projecting teeth that interleave with a complementary toothed inner surface of a female slot (not visible) in the inner jacket shaft 20. While the foregoing intermeshing-tooth engagement couples the steering shaft 28 to the inner jacket shaft 20 for common rotation therewith, a lower I-shaft bearing 30 rotatably couples the steering shaft 28 (and, indirectly, the inner jacket shaft 20) to the outer jacket shaft 22, as seen in FIG. 2. A distal end of the steering shaft 28 is coupled, e.g., via an intermediate coupler shaft (not shown), to the pinon gear of a rack-and-pinion steering mechanism 32. The steering mechanism 32, in turn, is coupled, e.g., via respective tie rods, to the vehicle's drive wheels 34. With this arrangement, directional inputs received from the driver via the steering wheel 18 are transmitted down through the inner jacket shaft 20 to the steering shaft 28, then through the steering shaft 28 to the steering mechanism 32, which responsively repositions the wheels 34 to alter the direction of the motor vehicle 10.

The inner and outer jacket shafts 20, 22 are telescopingly connected such that one or both shafts can selectively translate along a common longitudinal axis A1 with respect to the other shaft. In the illustrated example, the outer jacket shaft 22 has a tube-shaped configuration with a hollow core 23, and may have a circular cross-section, a rectangular cross-section, or any other cross-section to define an open proximal end 31 (FIG. 1). Likewise, the inner jacket shaft 22 has a tube-shaped configuration with a central cavity (into which is received the steering shaft 28), and may have a circular cross-section, a rectangular cross-section, or any other cross-section to define a distal end 21 (FIG. 2) that is complementary with the open end 32. It may be desirable, e.g., for ease of manufacture and assembly, that both the inner and outer jacket shafts 20, 22 have an elongated, generally cylindrical shape with the outer diameter (OD) shaft surface 33 of the inner jacket shaft 20 being approximately equal to or slightly smaller than the inner diameter (ID) shaft surface 35 of the outer jacket shaft 22. Distal end 21 of the inner jacket shaft 20 is slidably received through the hole in the open end 31 of the outer jacket shaft 22 and into the hollow core 23 such that the two shaft members are concentric and mated in a telescopically displaceable fashion, with the outer jacket shaft 22 circumscribing a portion of the inner jacket shaft 20. An optional clamping assembly 36 on the jacket mounting support 24 can be manually engaged to lock the inner jacket shaft 20 with respect to the outer jacket shaft 22 and thereby prevent relative telescoping displacement.

Housed within the steering column assembly 16, inside the hollow core 23 and interposed between the inner and outer jacket shafts 20, 22, is a viscous damper assembly 38 for attenuating resonant powertrain and road-induced vibrations transmitted up through the steering column assembly 16 to the steering wheel 18. The viscous damper assembly 38 includes an annular damper housing 40 that is nested inside a toroidal pocket 37 defined along the OD surface 33 of the inner jacket shaft 20. In the illustrated example, the damper housing 40 is a rectangular toroid (i.e., has a generally rectangular cross-section), and extends continuously around the outer periphery of the shaft's distal end 21. Alternative configurations can employ a housing design with other polygonal or non-polygonal cross-sections and/or a housing that extends in a discontinuous manner around the distal end 21 of the inner jacket shaft 20. With a toroidal geometry, the damper housing 40 has opposing ID and OD housing surfaces 41 and 43, respectively, as represented in the schematic illustration of FIG. 3. ID housing surface 41 abuts the OD shaft surface 33 of the inner jacket shaft 20, whereas the OD housing surface 43 abuts the ID shaft surface 35 of the outer jacket shaft 22 such the viscous damper assembly 38 acts as an intermediate conduit for vibrational energy. It is also envisioned, for an alternative embodiment, that the damper housing 40 of the viscous damper assembly 38 be mounted on the inner steering shaft 28 instead of the inner jacket shaft 20.

Figure 3:
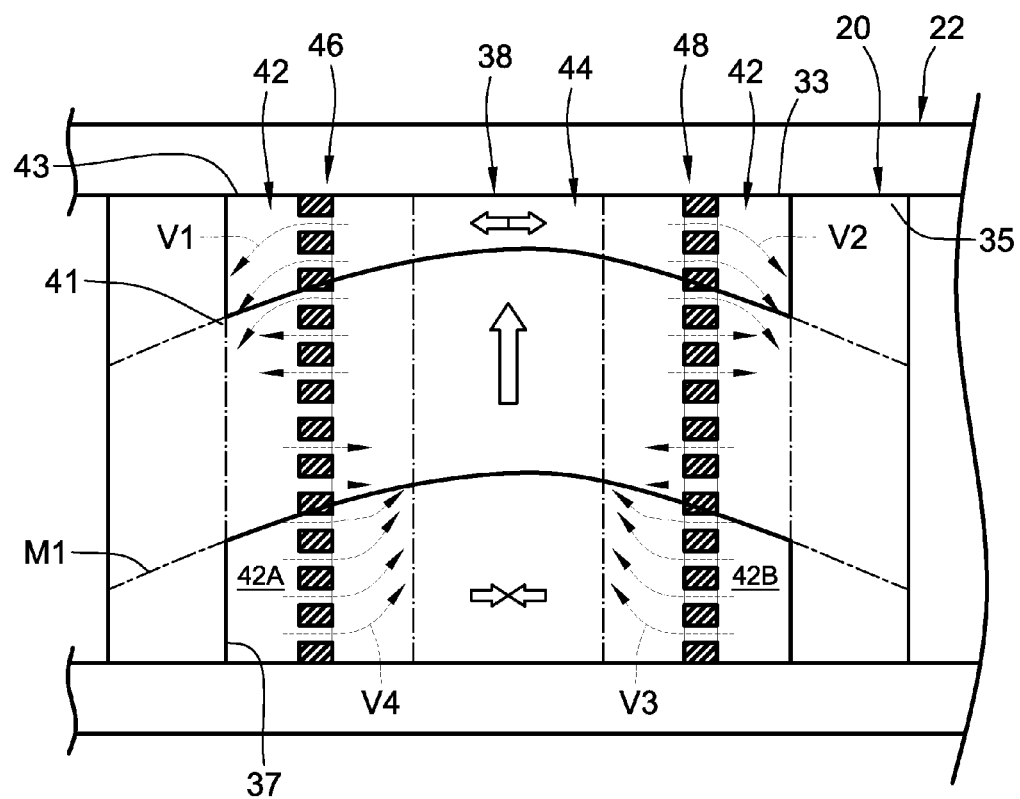
FIG. 3 is a schematic illustration of the representative viscous damper assembly of FIG. 2.

First and second fluid reservoir volumes, respectively designated at 42 and 44 in FIG. 3, are disposed inside the damper housing 40. Similar to the damper housing 40, both reservoir volumes 42, 44 can be annular in shape, and fabricated with a polygonal cross-section. As shown, the first reservoir volume 42 includes a pair of longitudinally spaced outer reservoir volumes 42A and 42B that sandwich therebetween the second reservoir volume 44. Recognizably, the number, shape, size and relative orientation of the reservoir volumes can be varied from that which is shown in the drawings. For instance, the damper housing 40 may stow therein a series of circumferentially spaced, longitudinally oriented pairs of fluidly coupled reservoir volumes. It may be desirable, for at least some embodiments, that the damper housing 40, including the reservoir volumes 42, 44, be fabricated as a unitary structure from a flexible polymer. This will allow for dynamic flexure of the viscous damper assembly 38 during vibrational displacement of telescoped shaft members 20, 22.

With continuing reference to FIG. 3, the viscous damper assembly 28 is fabricated with constricted flow channels that fluidly connect the first and second reservoir volumes 42, 44 such that viscous fluid can pass therebetween in a controlled and constrained manner. In particular, a first series of circumferentially spaced flow channels 46 is interposed between the outer section 42A of the first reservoir volume 42 and the centrally located second reservoir volume 44. Likewise a second series of circumferentially spaced flow channels 48 is interposed between the other outer section 42B of the first reservoir volume 42 and the centrally located second reservoir volume 44. Each of the flow channels is generally cylindrical and extends longitudinally with respect to the central axis Al of the viscous damper's housing 40. Like the reservoir volumes, the number, shape, size and relative orientation of the reservoir volumes can be modified, for example, to tune the viscous damper assembly 38 to provide specific vibration attenuating characteristics. As a non-limiting example, one of the sets of constricted flow channels 46, 48 can be eliminated and, commensurately, the spaced outer reservoir volumes 42A and 42B can be combined such that first reservoir volume is composed of a single fluid chamber.

In response to relative vibrational displacement between the inner and outer jacket shafts 20, 22, viscous fluid—represented in the drawings by arrows V1, V2, V3 and V4 in FIG. 3—is forced to flow from one reservoir volume, through the constricted flow channels, to the other reservoir volume. According to the illustrated example, vibrational energy causes the inner and outer jacket shafts 20, 22 to bend around a transverse moment (as indicated in an exaggerated manner by dashed line M1 in FIG.3). This same displacement causes the damper housing 40 to flex with the moving/vibrating shafts 20, 22. When this occurs, the first reservoir volume 42 dynamically decreases in size (or increases in size, depending on the direction of relative displacement) while the second reservoir volume 44 dynamically increases in size (or decreases in size) responsive to the displacement between the two shaft members 20, 22. The constricted fluid flow of the viscous fluid through the channels dissipates vibrational energy such that less energy is transmitted from the steering shaft 28 and inner jacket shaft 20 to the steering wheel 18.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A steering column assembly for connecting a steering wheel or handle to a vehicle body of a motor vehicle, the steering column assembly comprising:
   a first shaft member configured to attach to the steering wheel or handle;
   a second shaft member configured to attach to the vehicle body, the second shaft member telescopingly connected to the first shaft member such that the second shaft member can selectively translate longitudinally with respect to the first shaft member; and
   a viscous damper assembly interposed between the first and second shaft members, the viscous damper assembly including a damper housing, first and second reservoir volumes disposed inside the damper housing, and a plurality of constricted flow channels fluidly connecting the first and second reservoir volumes, the viscous damper assembly also including viscous fluid that flows from the first reservoir volume, through the constricted flow channels, to the second reservoir volume in response to relative vibrational displacement between the first and second shaft members to thereby viscously attenuate vibrational energy.

2. The steering column assembly of claim 1, wherein the first reservoir volume dynamically decreases in size while the second reservoir volume dynamically increases in size responsive to the displacement between the first and second shaft members.

3. The steering column assembly of claim 1, wherein the damper housing, the first reservoir volume, and the second reservoir volume are annular.

4. The steering column assembly of claim 3, wherein the constricted flow channels extend longitudinally within the damper housing, interposed between the first and second reservoir volumes.

5. The steering column assembly of claim 3, wherein the first reservoir volume includes a pair of longitudinally spaced outer reservoir volumes, and wherein the second reservoir volume is disposed between the outer reservoir volumes.

6. The steering column assembly of claim 5, wherein the constricted flow channels include two sets of flow channels, each of the sets of flow channels being interposed between the second reservoir volume and a respective one of the outer reservoir volumes.

7. The steering column assembly of claim 1, wherein the first and second shaft members cooperatively define an internal cavity therebetween, and wherein the viscous damper assembly is mounted within the internal cavity.

8. The steering column assembly of claim 1, wherein the first and second shaft members are concentric, the second shaft member circumscribing at least a portion of the first shaft member.

9. The steering column assembly of claim 8, wherein the first shaft member includes an outer diameter (OD) surface defining a toroidal pocket, and wherein the damper housing is nested within the toroidal pocket.

10. The steering column assembly of claim 9, wherein the damper housing is annular with opposing inner diameter (ID) and outer diameter (OD) housing surfaces, the ID housing surface abutting the OD surface of the first shaft member, and the OD housing surface abutting an inner diameter (ID) surface of the second shaft member.

11. The steering column assembly of claim 1, wherein the motor vehicle includes a steering mechanism, and wherein the first shaft member includes a steering shaft configured to connect the steering column assembly to the steering mechanism, the viscous damper assembly being mounted on the steering shaft.

12. The steering column assembly of claim 11, further comprising a bearing rotatably coupling the steering shaft to the second shaft member.

13. The steering column assembly of claim 1, further comprising a mounting bracket receiving therethrough the second shaft member and configured to mount the steering column assembly to the vehicle body.

14. A motor vehicle, comprising:
a vehicle body having a passenger compartment;
a plurality of wheels rotatably attached to the vehicle body;
a steering mechanism attached to the vehicle body and operable to reposition at least one of the wheels;
a manually-operated steering wheel disposed within the passenger compartment and configured to receive driver inputs to control directional changes of the motor vehicle; and
an adjustable steering column assembly, including:
an inner jacket shaft connected to the steering wheel, the inner jacket shaft having an outer surface defining a toroidal pocket;
a steering shaft connecting the inner jacket shaft to the steering mechanism;
an outer jacket shaft connected to the vehicle body, the outer jacket shaft circumscribing the inner jacket shaft and configured to translate longitudinally in a telescoping manner with respect to the inner jacket shaft; and a viscous damper assembly interposed between the inner and outer jacket shafts, the viscous damper assembly including an annular damper housing nested within the toroidal pocket of the inner jacket shaft and abutting the outer jacket shaft, first and second annular reservoir volumes disposed inside the damper housing, circumferentially spaced constricted flow channels extending longitudinally within the damper housing and fluidly connecting the first and second reservoir volumes, and viscous fluid configured to flow from the first reservoir volume, through the constricted flow channels, to the second reservoir volume in response to relative vibrational displacement between the inner and outer jacket shafts to thereby viscously attenuate vibrational energy.

15. A method of assembling a steering column assembly for connecting a steering wheel or handle to a vehicle body of a motor vehicle, the method comprising:
providing a first shaft member configured to attach to the steering wheel or handle;
providing a second shaft member configured to attach to the vehicle body;
connecting the first and second shaft members such that the second shaft member can translate longitudinally in a telescoping manner with respect to the first shaft member; and
mounting a viscous damper assembly between the first and second shaft members, the viscous damper assembly including a damper housing, first and second reservoir volumes disposed inside the damper housing, and a plurality of constricted flow channels fluidly connecting the first and second reservoir volumes, the viscous damper assembly also including viscous fluid that flows from the first reservoir volume, through the constricted flow channels, to the second reservoir volume in response to relative vibrational displacement between the first and second shaft members to thereby viscously attenuate vibrational energy.

16. The method of claim 15, wherein the first reservoir volume dynamically decreases in size while the second reservoir volume dynamically increases in size responsive to the displacement between the first and second shaft members.

17. The method of claim 15, wherein the damper housing, the first reservoir volume, and the second reservoir volume are annular.

18. The method of claim 17, wherein the constricted flow channels extend longitudinally within the damper housing, interposed between the first and second reservoir volumes.

19. The method of claim 17, wherein the first reservoir volume includes a pair of longitudinally spaced outer reservoir volumes, and wherein the second reservoir volume is disposed between the outer reservoir volumes.

20. The method of claim 15, wherein the first and second shaft members are concentric with the second shaft member circumscribing at least a portion of the first shaft member, and wherein the first shaft member includes an outer diameter (OD) surface defining a toroidal pocket, and wherein the damper housing is nested within the toroidal pocket.

* * * * *